(12) United States Patent
Leach et al.

(10) Patent No.: US 8,972,116 B2
(45) Date of Patent: Mar. 3, 2015

(54) PRESSURE AND ACCELERATION BASED PEDESTRIAN IMPACT SENSOR ASSEMBLY FOR MOTOR VEHICLES

(75) Inventors: William M. Leach, West Bloomfield, MI (US); Sylvia Pietzsch, Neuried (DE); Mustafa Cuma Celik, Dachau (DE); Herbert Höfelsauer, München (DE); Joshua Forwerck, Royal Oak, MI (US)

(73) Assignee: Autoliv ASP, Inc., Ogden, UT (US)

( * ) Notice: Subject to any disclaimer, the term of this patent is extended or adjusted under 35 U.S.C. 154(b) by 248 days.

(21) Appl. No.: 13/585,367

(22) Filed: Aug. 14, 2012

(65) Prior Publication Data

US 2014/0052341 A1    Feb. 20, 2014

(51) Int. Cl.
| | |
|---|---|
| *B60R 21/0132* | (2006.01) |
| *B60R 21/0136* | (2006.01) |
| *B60R 19/02* | (2006.01) |
| *B60R 21/34* | (2011.01) |

(52) U.S. Cl.
CPC ......... *B60R 21/0136* (2013.01); *B60R 21/0132* (2013.01); *B60R 19/02* (2013.01); *B60R 21/34* (2013.01)
USPC .............................. 701/45; 180/274; 280/735

(58) Field of Classification Search
None
See application file for complete search history.

(56) References Cited

U.S. PATENT DOCUMENTS

| | | | |
|---|---|---|---|
| 6,882,916 B2 * | 4/2005 | Takafuji et al. | 701/45 |
| 6,929,282 B1 | 8/2005 | Zoratti et al. | |
| 7,098,778 B1 | 8/2006 | Zoratti et al. | |
| 7,737,833 B2 * | 6/2010 | Takafuji | 340/436 |
| 7,753,419 B2 * | 7/2010 | Kondo | 293/117 |
| 7,828,350 B2 | 11/2010 | Kiribayashi | |
| 7,911,331 B2 | 3/2011 | Tanabe | |
| 8,374,751 B2 * | 2/2013 | Katz et al. | 701/45 |
| 2004/0186643 A1 * | 9/2004 | Tanaka et al. | 701/45 |
| 2009/0312949 A1 * | 12/2009 | Suzuki et al. | 701/301 |

FOREIGN PATENT DOCUMENTS

DE    10 2010 018 400 A1    10/2010

* cited by examiner

*Primary Examiner* — Redhwan K Mawari
*Assistant Examiner* — Edward Torchinsky
(74) *Attorney, Agent, or Firm* — Brinks Gilson & Lione (57) ABSTRACT

A sensor assembly for a motor vehicle adapted for sensing impacts including pedestrian impacts. The sensor assembly integrates functions of pressure based sensors used in one embodiment with a compressible tube extending laterally across the front surface of the vehicle and the outboard front boundary areas of the front end of the vehicle. Both acceleration and pressure based sensors are mounted into an integrated sensor housing which is mounted in a desired position at the vehicle front fascia front boundary areas. The system optimizes pressure based sensing while providing acceleration based sensing at the lateral boundary areas where supporting structure does not enable pressure based sensing. The invention further including sensor arrangements including discrete pressure and acceleration sensors deployed for detecting pedestrian impacts at the center and front boundary areas of the vehicle front end.

19 Claims, 6 Drawing Sheets

PRESSURE AND ACCELERATION BASED PEDESTRIAN IMPACT SENSOR ASSEMBLY FOR MOTOR VEHICLES

FIELD OF THE INVENTION

This invention relates to a vehicle mounted sensor system and, in particular, to one adapted to be mounted to the front end of a motor vehicle for detecting pedestrian-involved impacts like pedestrian and bicyclists impacts, and activating appropriate impact mitigation countermeasures.

BACKGROUND OF THE INVENTION

Motor vehicle collisions with pedestrians and bicyclists are a significant concern. While significant advancements have been made in protecting motor vehicle occupants from injury due to impacts, there remain significant opportunities to reduce injuries, particularly head injuries to pedestrians struck by motor vehicles. Various countermeasure systems have been devised for this purpose and are in use. Hood lifter mechanisms pop the engine compartment hood to an upward displaced position where it can absorb energy as a struck pedestrian hinges about their lower torso and strikes the hood area during an impact. The lifted hood provides energy absorption. Other measures such as external airbags have further been conceived and implemented. In this description, reference to pedestrian impacts is intended to include other types of impacts including those with bicyclists or animals and other low-energy (as compared with striking other vehicles or fixed objects) impacts.

For any deployable pedestrian impact countermeasure to be operative, some means of detecting the impact is required. Numerous systems are available for detecting such impacts. One approach uses an elongated flexible hollow tube which defines an enclosed volume of gas. Upon an impact, the soft fascia of the vehicle front end is deformed and the sensor tube is compressed, generating a gas pressure in the tube which is transmitted to a pressure sensor, thereby detecting the impact. For these systems to be operative, a supporting structure behind the pressure based sensor is necessary. This enables the necessary compression to occur for generating the pressure pulse. Numerous other sensor technologies may be implemented which measure strain or compression exerted by deformation of the vehicle front end fascia. Other types of low energy impact sensing systems include switch arrays, piezo cable, fiber optic, etc. All such sensing techniques based on compression will be referred herein as compressive or compression sensors.

A particular design challenge is posed in extending the sensitive area of the vehicle front end to low energy impacts to include the outer corners or edges of the front end (referred in this description also as the end, the most-outer end, or the boundaries of the front end). Typical passenger car and light truck vehicles feature rounded front end corners which creates a glancing or oblique impact if the pedestrian strikes the vehicle in these areas. The glancing impact may not provide the necessary compression for a compression sensor. Moreover, typical vehicle front ends feature an energy absorbing cross beam in the front end needed for meeting low speed impact requirements. The structure of the energy absorbing beam may not extend laterally to these outer front corners. Accordingly, it is often the case that an underlying structure necessary for creating a reaction force to the impact resulting in compression of the sensing system in these outer corner areas is absent.

In view of the aforementioned, there is a need in the art for improved pedestrian impact system which addresses the previously mentioned shortcomings in prior art systems.

In any volume produced automotive application, cost concerns are significant. The increased sophistication and capabilities of motor vehicles must be provided in an efficient and low cost manner in order that the features become commercially viable. Accordingly, systems provided to meet the design objectives mentioned above need to be manufacturable and capable of being assembled in a cost effective manner.

SUMMARY OF THE INVENTION

In accordance with the present invention, a pedestrian sensor system is provided incorporating features of compressive and acceleration based sensors. The compressive based system is used in a front center section of the front end where the supporting bumper structure is present. In the outer corner areas, an acceleration based sensor is provided. For efficient packaging and installation considerations, in one embodiment of the present invention, the acceleration and pressure based sensors are conveniently mounted in a unitary package with mounting features so that the acceleration sensors can be properly oriented with regard to the fascia surface. Despite the lack of supporting structure, the acceleration based sensors undergo acceleration as they are impacted and may not necessitate compression to create a sensor output.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
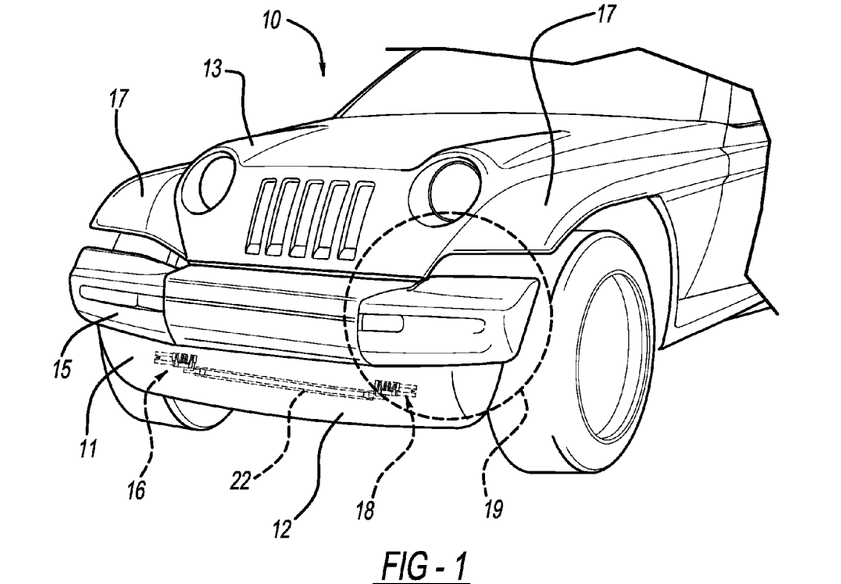
FIG. 1 is a front pictorial view of a motor vehicle incorporating a sensor system in accordance with this invention.
Figure 2:
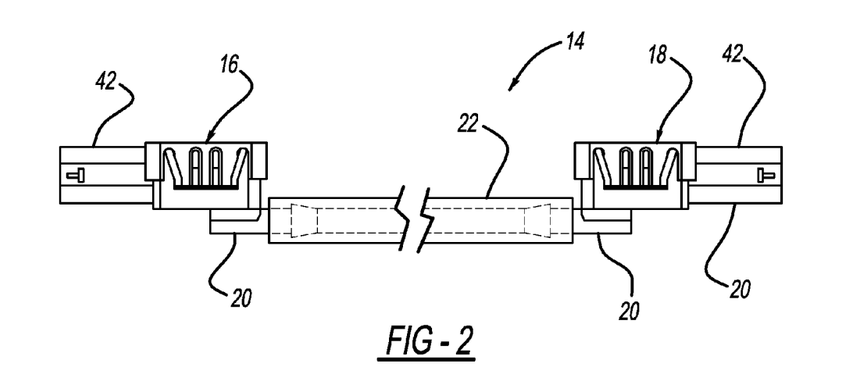
FIG. 2 is a pictorial view of the sensor assembly from FIG. 1.

With reference to FIG. 1, a representative motor vehicle 10 is shown with its front end 11 which includes front fascia 12, hood 13, and bumper 15, which joins front fenders 17 at front boundary (corner) areas 19. In the lower portion of front end 11, which could be behind front fascia 12 or bumper 15 is provided sensor assembly 14 in accordance with the present invention. Sensor assembly 14 is optimally placed behind the motor vehicle part that receives the best or first contact with a pedestrian during an impact and also high in terms of integration of the components. In the illustrated embodiment, sensor assembly 14 is mounted behind front fascia 12, but is shown in FIG. 1 in broken lines to show its positioning. Sensor assembly 14 is shown pictorially in FIG. 2 and includes sensor assembly housings 16 and 18 which may be identical parts, or they could be specialized parts adapted for right-hand and left-hand mounting positions. As shown, each of housings 16 and 18 include barbed tube connections 20. Flexible tube 22 extends between housings 16 and 18. As will be described in more detail below, compression of tube 22 generates a pressure pulse which is detected by internal pressure sensors within housings 16 and 18. Accordingly, sensor assembly 14 features a compressive sensor of a type using a fluid pressure signal. FIG. 1 illustrates an SUV type motor vehicle 10; however, the invention is equally applicable to a variety of motor vehicle types including sedan-type passenger cars.

Figure 3:
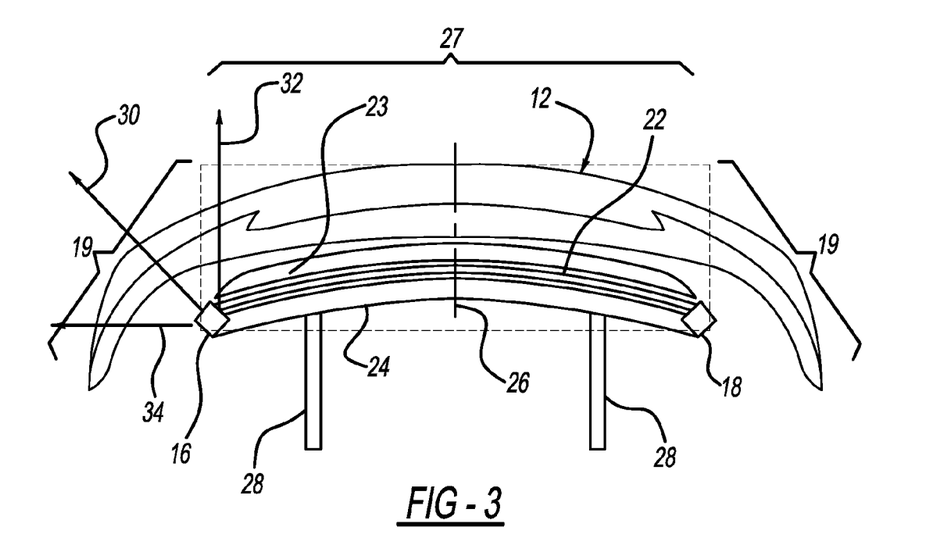
FIG. 3 is overhead schematic drawing of the sensor system and one possible relationship with motor vehicle structural components.

FIG. 3 is a pictorial view showing the installation position of sensor assembly 14 in accordance with this invention. As mentioned above, sensor assembly 14 is mounted behind fascia 12 and may also be mounted behind energy absorbing material 23. Cross beam 24 extends laterally from the vehicle centerline 26 and is supported by longitudinal beam 28. An impact of the front end 11 deforms fascia 12, compressing tube 22 between the fascia and bumper beam 24, thereby generating the pressure signal mentioned previously. At the outboard front corner areas 19 regions of the front end 11 which extend laterally past cross beam 24 (and also designated as the areas laterally outboard of the dashed-line box in FIG. 3), the pressure based sensor (or other compressive or compression sensor) lacks backing support for reliable compression of tube 22. Front corner areas 19 are defined as the region laterally outboard of cross beam 24 and extending to the surface of front end 11, merging with vehicle front fenders 17. Center section 27 is the front end region inboard of corner areas 19. As mentioned previously, corner areas 19 may also be described as the end, the most-outer end, or the boundaries of the vehicle front end 11.

A compression-based sensor may also communicate with structures filled with energy absorbing material such as foam or other elastomeric materials. Compression of such materials will generate a pressure pulse which can be detected by the sensor.

As shown in FIG. 3, sensor assembly housings 16 and 18 are mounted laterally past the lateral edges of cross beam 24 and, in accordance with this invention, integrally incorporate an acceleration based sensor which may have a sensing axis 30 oriented in various manners. In FIG. 3 there is shown a sensing axis 30 oriented oblique to vehicle centerline 26. The sensor sensing axis direction 30 can be oriented to be normal to fascia 12 at the sensor housing location, or in other directions such as direction 32 parallel to the vehicle direction of travel and vehicle centerline 26, or laterally in direction 34. The acceleration sensor could also be a multi-axis sensor, or more than one sensor could be used with more than one corresponding sense axis.

Figure 4:
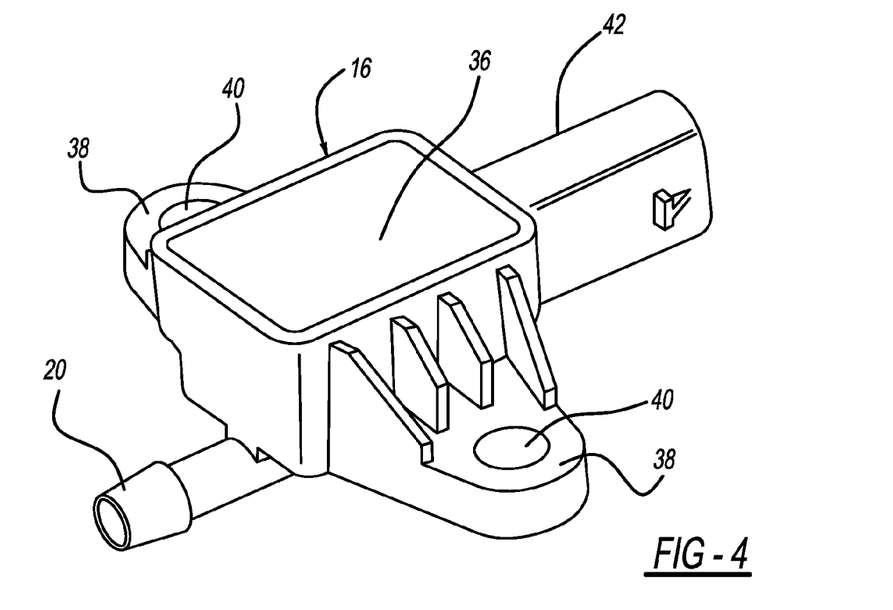
FIG. 4 is a pictorial view of the sensor housing in accordance with this invention.

FIG. 4 is a pictorial view of sensor assembly housing 16 or 18 (since they may be identical, housings 16 and 18 are described with reference to housing 16). As illustrated, housing 16 includes a hollow body section 36, a pair of projecting mounting pads 38 with fastener apertures 40, extending tube connection 20, and an electrical connector 42. Conveniently, housing 16 is formed by injection molding of a plastic resin material.

Figure 5:
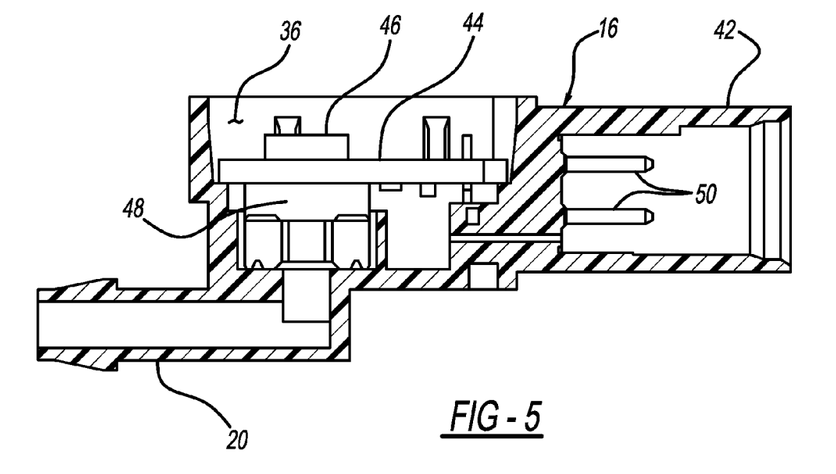
FIG. 5 is a cross-sectional view of the sensor housing shown in FIG. 4.

FIG. 5 is a cross-sectional view through sensor assembly housing 16. The illustration shows an internally mounted PC board 44 mounted within hollow body 36. PC board 44 has on one surface, acceleration sensor 46 shown mounted on the upper surface of the PC board. The lower surface has mounted pressure sensor 48 which is fluidically sealed with the inside of tube 22 and tube connection 20. It is noted that the gas volume defined by the tube 22 and the connected volumes of sensor housings 16 and 18 may have an intentional leakage path to atmosphere to allow ambient pressure equalization, while preserving response to rapid pressure changes in response to an impact. As shown, electrical connector 42 includes internal terminals 50 which are electrically connected to PC board 44. Acceleration sensor 46 and pressure sensor 48 are preferably integrated types having internal signal processing electronic elements and made as an integrated chip component having electrical connections for wire binding to PC board 44. The upper region of hollow body 36 can be potted with sealant or a separate resin cover component can be bonded or fastened to enclose housing 16.

Figure 6:
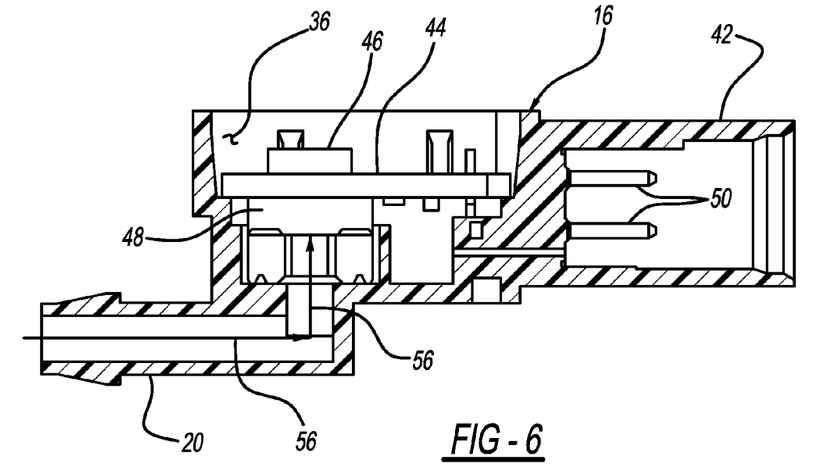
FIG. 6 illustrates the sensor housing receiving a pressure pulse signal.
Figure 7:
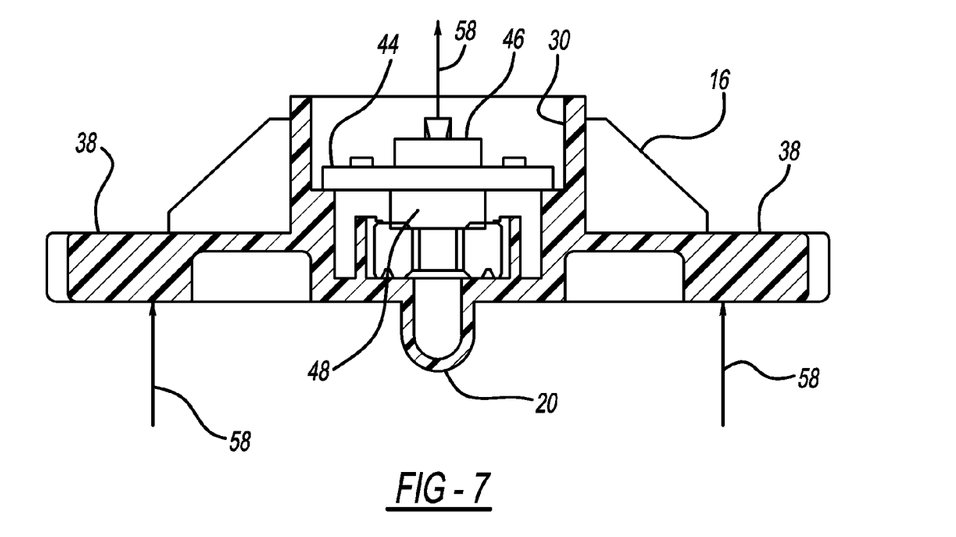
FIG. 7 is a cross-sectional view of the sensor illustrating and sensor receiving an acceleration signal.

FIG. 6 illustrates graphically a pressure pulse being applied to sensor assembly housing 16. As shown, the arrows 56 indicate a pressure pulse being conducted through tube 22 into tube connector 20 and acting upon pressure sensor 48. FIG. 7 illustrates diagrammatically acceleration sensor 46 providing a signal due to acceleration acting on sensor assembly housing 16 designated by arrows 58. Thus, housing 16 integrates the functions of pressure (or compression) and acceleration based sensors in an integrated package. Since the sensing axis 30 or sensor direction of acceleration sensor 46 is important in the design of the system, mounting pads 38 are affixed in a desired manner with regard to vehicle structures, such as directly to fascia 12, internal brackets, extensions of cross beam 24, or other structure.

Figure 8:
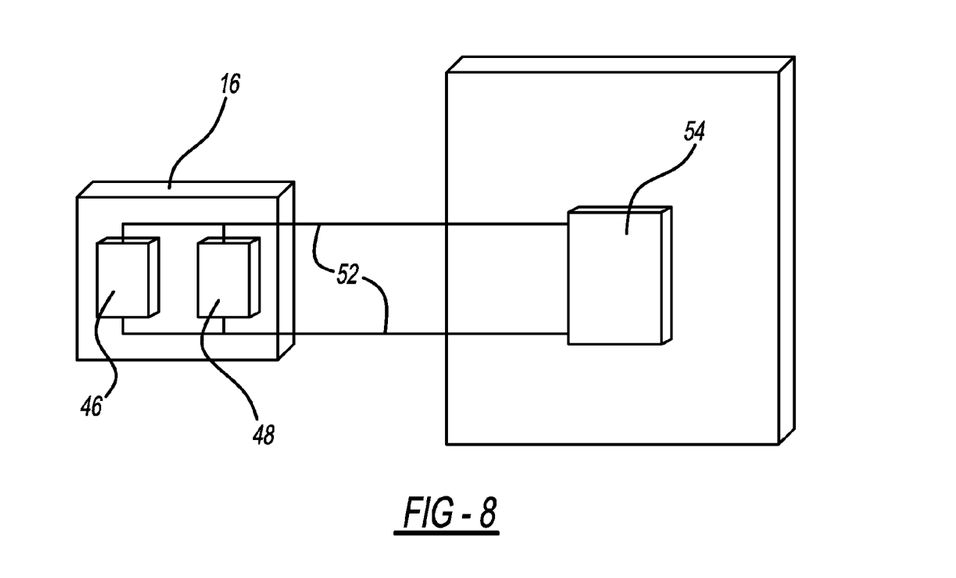
FIG. 8 is a schematic view of the electrical connections in the system.

FIG. 8 shows diagrammatically the relationship between the sensor system of the invention and other portions of a restraint system controller for the vehicle. As shown, housing 16 provides a mount for both acceleration sensor 46 and pressure sensor 48 which produce signals sent via signal lines 52 to a restraint system controller 54. Controller 54 can provide numerous other safety related functions for the vehicle including the deployment of passive occupant restraint systems such as inflatable restraints, belt pretensioners, and other safety measures.

Figure 9A:
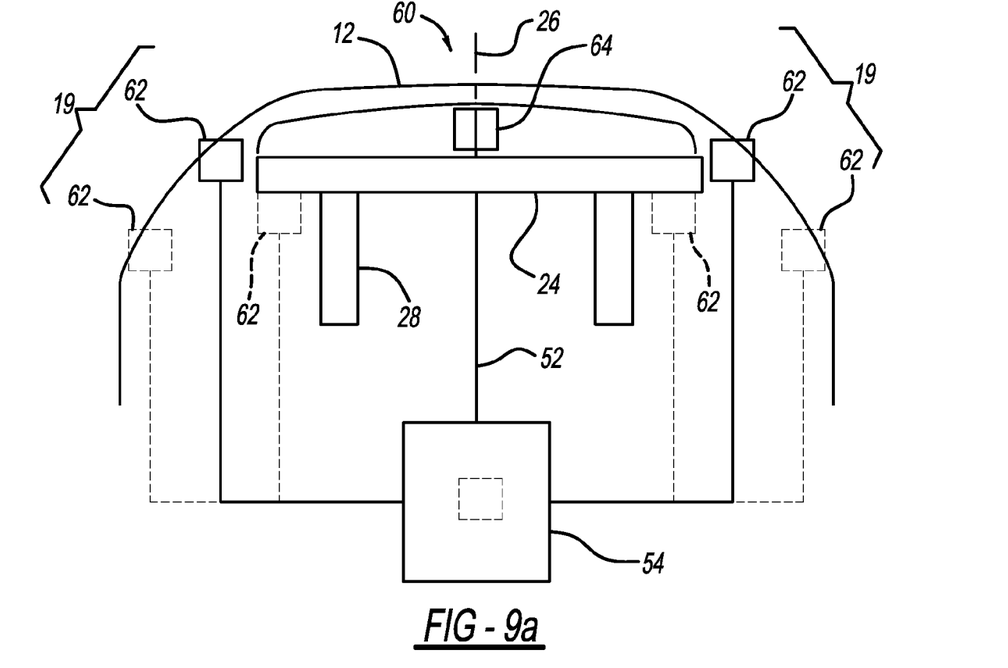
FIGS. 9a and 9b are schematic representations of an alternate embodiment of the present invention.
Figure 9B:
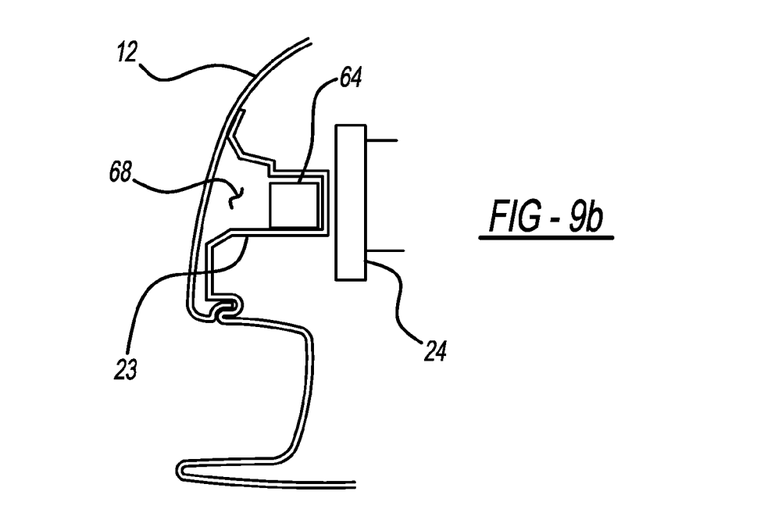

FIGS. 9a and 9b illustrate an alternate embodiment of a sensor arrangement 60 in accordance with the present invention. As illustrated, sensor arrangement 60 does not utilize the integrated acceleration and pressure sensors provided by sensor assembly 14. Instead, separate acceleration sensors 62 and pressure (or another compressive or compression) sensors 64 are used. FIG. 9a illustrates schematically that a pressure sensor 64 is used to measure impacts acting on cross beam 24, whereas separate acceleration sensors 62 are provided along fascia 12 in front corner areas 19. As shown, more than one acceleration sensor 62 may be provided in each of front corner areas 19. One or more acceleration sensors 62 could be mounted to cross beam 24 to measure acceleration of that component, providing measurement of higher severity impacts. The implementation of sensor arrangement 60 provides many of the advantages of the system previously described in that it provides compressive based sensor in the center area of front and 11 while using acceleration-based pedestrian impact sensing at front corner areas 19. Sensor arrangement 60 can utilize an enclosed volume 68 behind fascia 12 provided by energy absorbing material 23. If such an enclosed volume 68 can be formed it may be a means of transmitting a pressure pulse to pressure sensor 64, eliminating the need for a separate tube 22.

Figure 10A:
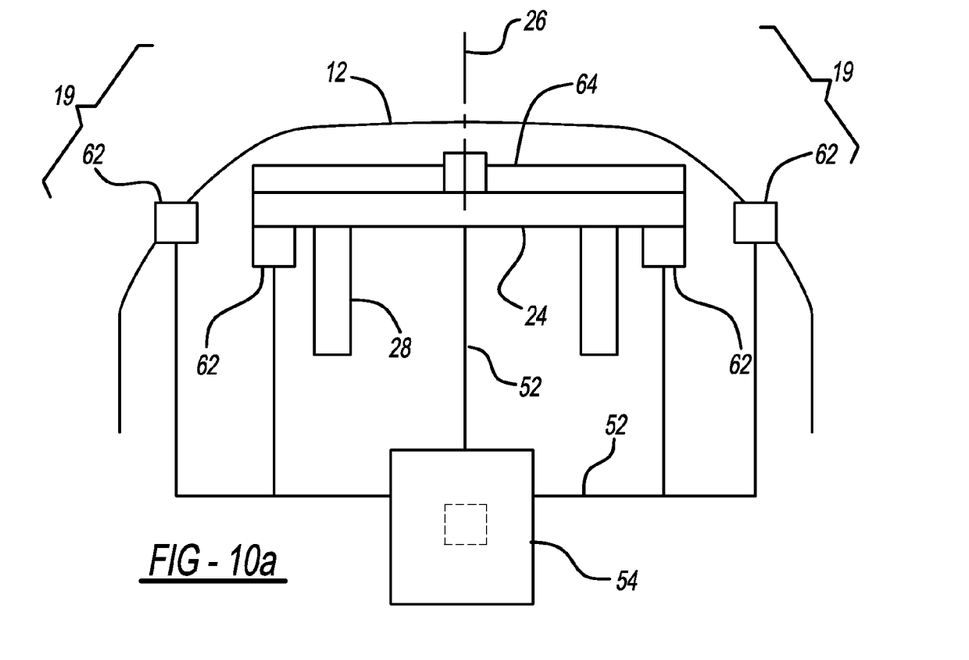
FIGS. 10a and 10b are schematic representations of a further alternate embodiment of the present invention.
Figure 10B:
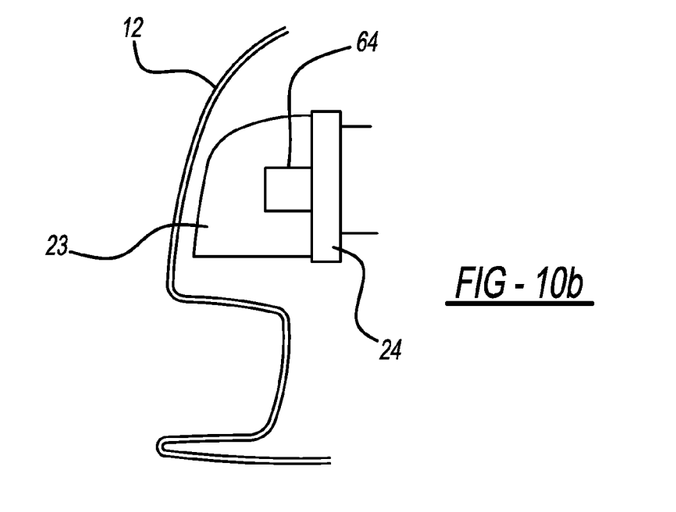

FIGS. 10a and 10b illustrate an alternate sensor arrangement 66 which, like sensor arrangement 60, uses discrete acceleration sensors 62 and a compressive based sensor 64. In this instance, single acceleration sensors 62 are implemented for front corner areas 19. Cross beam 24 features compressive based pressure sensor 64. In this case, pressure sensor 64 utilizes an enclosed tube 22 to conduct a pressure pulse to the pressure sensor. Arrangement 66 further illustrates single acceleration sensors 62 at each front corner area 19. The acceleration sensors 62 illustrated in FIGS. 9a, 9b, 10a, and 10b may be oriented with their sensing axes 30 oriented in various directions, including those diagramed in FIG. 3. Moreover, the sensing axes 30 of multiple accelerations sensors 62 may be oriented in differing directions from one another where more than one is used on each front corner area 19.

For implementation of compressive based sensors which do not use gas pressure for sensing, tube 22 may be replaced by a compressive element or an array of compressive elements arranged along a strip extending across the vehicle in the position shown for the tube.

While the above description constitutes the preferred embodiment of the present invention, it will be appreciated that the invention is susceptible to modification, variation, and change without departing from the proper scope and fair meaning of the accompanying claims.

What is claimed is:

1. A low-energy impact sensor assembly for mounting to the front end of a motor vehicle for detecting a low energy impact such as a pedestrian impact for deploying an impact countermeasure, wherein the front end has a bumper beam extending laterally across the front end with a left bumper beam end and a right bumper beam end, the low-energy impact sensor assembly comprising:
a left acceleration sensor in a housing with a mounting feature for affixing the housing to the motor vehicle near the left bumper beam end extend laterally outboard from the left bumper beam end and, a right acceleration sensor in a housing with a mounting feature for affixing the housing to the motor vehicle near the right bumper beam end, the left and right acceleration sensors each extending laterally outboard of the bumper beam and having at least one sensing axis oriented in a predetermined orientation with respect to the motor vehicle, the let acceleration sensor acting to detect the impact due to acceleration of the left bumper beam end and the right acceleration sensor acting to detect the impact due to acceleration of the right bumper beam end, and
a compression sensor acting to detect the impact by compression of a component extending between the left acceleration sensor and the right acceleration sensor, the compression sensor and the left and right acceleration sensors acting together to detect the impact.

2. A low-energy impact sensor assembly for mounting to the front end of a motor vehicle for detecting a low energy impact such as a pedestrian impact for deploying an impact countermeasure, comprising:
an acceleration sensor in a housing with a mounting feature for affixing the housing to the motor vehicle at a predetermined position, the acceleration sensor having at least one sensing axis oriented in a predetermined orientation with respect to the motor vehicle, the acceleration sensor acting to detect the impact due to acceleration of the acceleration sensor, and
a compression sensor acting to detect the impact by compression of a component of the motor vehicle, the compression sensor and the acceleration sensor acting together to detect the impact,
wherein the compression sensor is mounted to the housing.

3. The low-energy impact sensor assembly according to claim 1 further comprising that the compression sensor is pressure sensor communicating with an enclosed volume of a gas, wherein the pressure sensor detects the impact when the enclosed volume is decreased by compression during the impact.

4. The low-energy impact sensor assembly according to claim 3 further comprising that the enclosed volume is defined by a deformable pressure tube forming the component extending between the left bumper beam end and the right bumper beam end.

5. The low-energy impact sensor assembly according to claim 4 further comprising a pair of the housing assemblies being connected with opposing ends of the pressure tube.

6. The low-energy impact sensor assembly according to claim 4 further comprising that the housing assembly and the pressure tube are mounted behind a fascia covering at least a portion of the front end.

7. The low-energy impact sensor assembly according to claim 6 further comprising that the tube mounted between the fascia and the bumper beam.

8. The low-energy impact sensor assembly according to claim 1 further comprising that the direction of the at least one sensing axis is oriented in a direction parallel to the longitudinal axis of the motor vehicle.

9. The low-energy impact sensor assembly according to claim 1 further comprising that the direction of the at least one sensing axis is oriented in a direction oblique to the longitudinal axis of the motor vehicle.

10. The low-energy impact sensor assembly according to claim 1 further comprising that the direction of the at least one sensing axis is oriented in a direction perpendicular to the longitudinal axis of the motor vehicle.

11. The low-energy impact sensor assembly according to claim 3 further comprising that the compression sensor is mounted to the housing, the housing forming a hollow body having a PC board mounted therein, wherein the acceleration sensor is mounted to one surface of the PC board and the pressure sensor is mounted to an opposing surface of the PC board.

12. The low-energy impact sensor assembly according to claim 11 further comprising that the housing forming an internal volume communicating the pressure tube with the pressure sensor whereby compression of the tube generates a pressure acting on the pressure sensor.

13. A low-energy impact sensor system for a front end of a motor vehicle for detecting a pedestrian impact for deploying an impact countermeasure, the front end including a laterally extending cross beam, a left front boundary area and a right front boundary area, the left and right front boundary areas extending laterally outboard of the cross beam, the low-energy impact sensor system comprising;
a left acceleration sensor and a right acceleration sensor having at least one sensing axis oriented in a predetermined orientation with respect to the motor vehicle, the let acceleration sensor mounted to or adjacent to the front fascia in the left front boundary area, the right acceleration sensor mounted to or adjacent to the front fascia in the right front boundary area;
a pressure sensor communicating with an enclosed volume of a gas, the enclosed volume of gas extending laterally across the width of the cross beam wherein the pressure sensor detects the pedestrian impact when the enclosed volume is decreased by compression, and the let acceleration sensor detects the pedestrian impact due to acceleration of the let acceleration sensor, and the right acceleration sensor detects the pedestrian impact due to acceleration of the right acceleration sensor, and a restraint system controller receiving signals from at least one of the pressure sensor, the left acceleration sensor, and the right acceleration sensor to deploy the countermeasures based on at least one of a pressure signal from the pressure sensor and an acceleration signal from one of the left and right acceleration sensors.

14. The low-energy impact sensor system according to claim 13 further comprising that the enclosed volume is the enclosed volume defined by a pressure tube extending across the cross beam.

15. The low-energy impact sensor system according to claim 13 further comprising that the enclosed volume is defined by an energy absorbing member positioned between the front fascia and a cross beam of the vehicle.

16. The low-energy impact sensor system according to claim 13 further comprising an acceleration sensor mounted to the cross beam.

17. The low-energy impact sensor system according to claim 13 further comprising that the direction of the sensing axis is oriented in a direction parallel to the longitudinal axis of the motor vehicle.

18. The low-energy impact sensor system according to claim 13 further comprising that the direction of the sensing axis is oriented in a direction oblique to the longitudinal axis of the motor vehicle.

19. The low-energy impact sensor system according to claim 13 further comprising that the direction of the sensing axis is oriented in a direction perpendicular to the longitudinal axis of the motor vehicle.

* * * * *